United States Patent [19]

Efron et al.

[11] Patent Number: 4,893,905

[45] Date of Patent: Jan. 16, 1990

[54] OPTICAL LIGHT VALVE SYSTEM FOR PROVIDING PHASE CONJUGATED BEAM OF CONTROLLABLE INTENSITY

[75] Inventors: Uzi Efron, Los Angeles; Yuri Owechko, Newbury Park, both of Calif.

[73] Assignee: Hughes Aircraft Company, Los Angeles, Calif.

[21] Appl. No.: 204,646

[22] Filed: Jun. 10, 1988

[51] Int. Cl.[4] ............... G02F 1/133; G02F 1/135; G02F 1/01

[52] U.S. Cl. .................. 350/338; 350/331 R; 350/342; 350/354

[58] Field of Search ............ 350/342, 338, 331 R, 350/354, 337

[56] References Cited

U.S. PATENT DOCUMENTS

| | | | |
|---|---|---|---|
| 4,762,397 | 8/1988 | Pepper | 350/342 |
| 4,773,719 | 9/1988 | Anderson et al. | 350/3.64 |
| 4,778,261 | 10/1988 | Boyd et al. | 350/354 |
| 4,807,970 | 2/1989 | Dube et al. | 350/3.64 |
| 4,807,976 | 2/1989 | Little et al. | 350/342 |

OTHER PUBLICATIONS

E. Marom et al., "Phase Conjugation of Low—Power Optical Beams Using Liquid—Crystal Light Valves," Optics Letters, vol. 12, No. 7, Jul. 1987, pp. 504–506.

Primary Examiner—Stanley D. Miller
Assistant Examiner—Anita Pellman Gross
Attorney, Agent, or Firm—V. D. Duraiswamy; W. K. Denson-Low

[57] ABSTRACT

An optical light valve system 10 for providing an amplified phase conjugated replica $S_1^*$ of a potentially low intensity phase aberrated optical signal beam $S_1$ is disclosed herein. The optical light valve system 10 of the present invention includes a reference beam source 17 for providing a coherent reference beam R having first and second components of first and second polarization states, respectively. Further included is a signal beam source 15 for providing a coherent signal beam S of the first polarization state. An improved optical light valve 20 phase conjugates the second component of the reference beam in response to the aberrated beam $S_1^*$.

11 Claims, 3 Drawing Sheets

OPTICAL LIGHT VALVE SYSTEM FOR PROVIDING PHASE CONJUGATED BEAM OF CONTROLLABLE INTENSITY

BACKGROUND OF THE INVENTION

1. Field of the Invention

The present invention relates to optical beam transmission systems. More specifically, the present invention relates to electro-optical light valves used in such systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In a number of conventional optical systems aberrations in the phase of a transmitted beam may occur during propagation through a distorting medium. One method employed in compensating for these phase aberrations has been to pass a phase conjugated replica of the perturbed optical beam back through the distorting medium. A phase conjugated replica of an optical beam has a complex spatial amplitude equivalent to the complex conjugate of the amplitude of the original beam. Following traversal of the distorting medium the phase conjugated replica of the perturbed optical beam is transformed into a relatively undeformed version of the original optical beam.

One conventional optical phase conjugation technique utilizes a combination of a wavefront sensor and a phase conjugating crystal to imprint the spatial phase modulation obtained from the wavefront sensor onto the crystal in a closed loop operation. Low sensitivity to weak signals has limited the efficacy of this technique in certain applications. In particular, phase conjugating crystals typically require incident signals on the order of watts to tens of watts per square centimeter to provide adequate phase conjugation. This requirement may preclude inclusion of such phase conjugating crystals in, for example, certain high sensitivity imaging systems.

Recently liquid crystal light valves (LCLVs) have also been utilized in phase conjugation of optical signals. (see Garibyan, et al, "Optical Phase Conjugation by Microwatt Power of Reference Waves via Liquid Crystal Light Valve", *Optics Communications*, Vol. 38, no. 1, July 1981 and also E. Marom and U. Efron, "Phase Conjugation of Low-Power Optical Beams Using Liquid-Crystal Light Valves", *Optics Letters*, Vol. 12, 504, July 1987.) The sensitivity of these LCLVs to low intensity signals has been demonstrated by Garibyan to be orders of magnitude greater than the corresponding sensitivity typically exhibited by phase conjugating crystals.

Within the optical light valve system described by Garibyan, a "photosensible semiconductor" layer and a liquid crystal layer are separated by a dielectric mirror. A voltage is applied externally between the photosensitive semiconductor and liquid crystal layers. Hereinafter, the photosensitive semiconductor layer will be referred to as a "photoconductor". A reference beam and a signal beam are incident on the dielectric mirror and respective portions of each are transmitted to the photoconductor. The remaining portions of each beam are then reflected back through the liquid crystal layer. An interference pattern is formed near the photoconductor by interaction of the transmitted portions of the reference and signal beams. As is well known, this interference pattern subsequently induces spatial variations in the impedance of the photoconductor. Moreover, as the liquid crystal and photoconductor are effectively electrically connected in series, these impedance changes are mirrored as spatial variations in the voltage drop across the liquid crystal. In this manner the interference pattern is impressed upon the liquid crystal layer.

The liquid crystal layer modulates the phase of the propagating optical energy in response to an applied voltage. As a result, the portion of the reference beam reflected back through the liquid crystal layer will be modulated in response to spatial variations in the voltage drop induced by the interference pattern. A specific geometrical orientation of the reference beam relative to the longitudinal axis of the liquid crystal layer provides a portion of the reflected reference beam with a phase conjugated version of the original signal beam.

Although the system disclosed by Gariban is sensitive to signals of low intensity, the magnitude of the phase conjugated signal is limited by the saturation level of the photoconductor. Specifically, the proportion of the reference beam penetrating the dielectric mirror and illuminating the photoconductor is fixed once a particular dielectric mirror has been chosen. It follows that the magnitude of the reference beam may not be increased above a certain level without saturating the photoconductor and thereby overwhelming the interference pattern.

As the magnitude of the phase conjugated signal is proportional to the magnitude of the reflected portion of the reference beam, constraints on the intensity of the reference beam effectively determine the maximum intensity of the conjugated signal. Further, although increasing the reflectivity of the dielectric mirror increases the allowed reference beam intensity, the sensitivity of the system to weak signal beams will be correspondingly lowered.

The relatively weak intensity of the phase conjugated beam in the system proposed by Garibyan limits the utility of this system for a variety of applications unless a separate amplifying element is used. Inclusion of an amplifying element, however, often complicates overall system design since a reimaging of the conjugated signal will then be typically required.

Hence a need in the art exists for an optical light valve system for providing an amplified phase conjugated replica of a potentially low intensity optical beam.

SUMMARY OF THE INVENTION

The need in the art for providing an amplified phase conjugated replica of a potentially low intensity optical beam is addressed by the optical light valve system of the present invention. The light valve system of the present invention includes means for providing a coherent reference beam having first and second components of first and second polarization states, respectively. Further included is a means for providing a coherent signal beam of the first polarization state. A light valve means phase conjugates the second component of the reference beam in response to the signal beam.

DETAILED DESCRIPTION OF THE INVENTION

Figure 1:
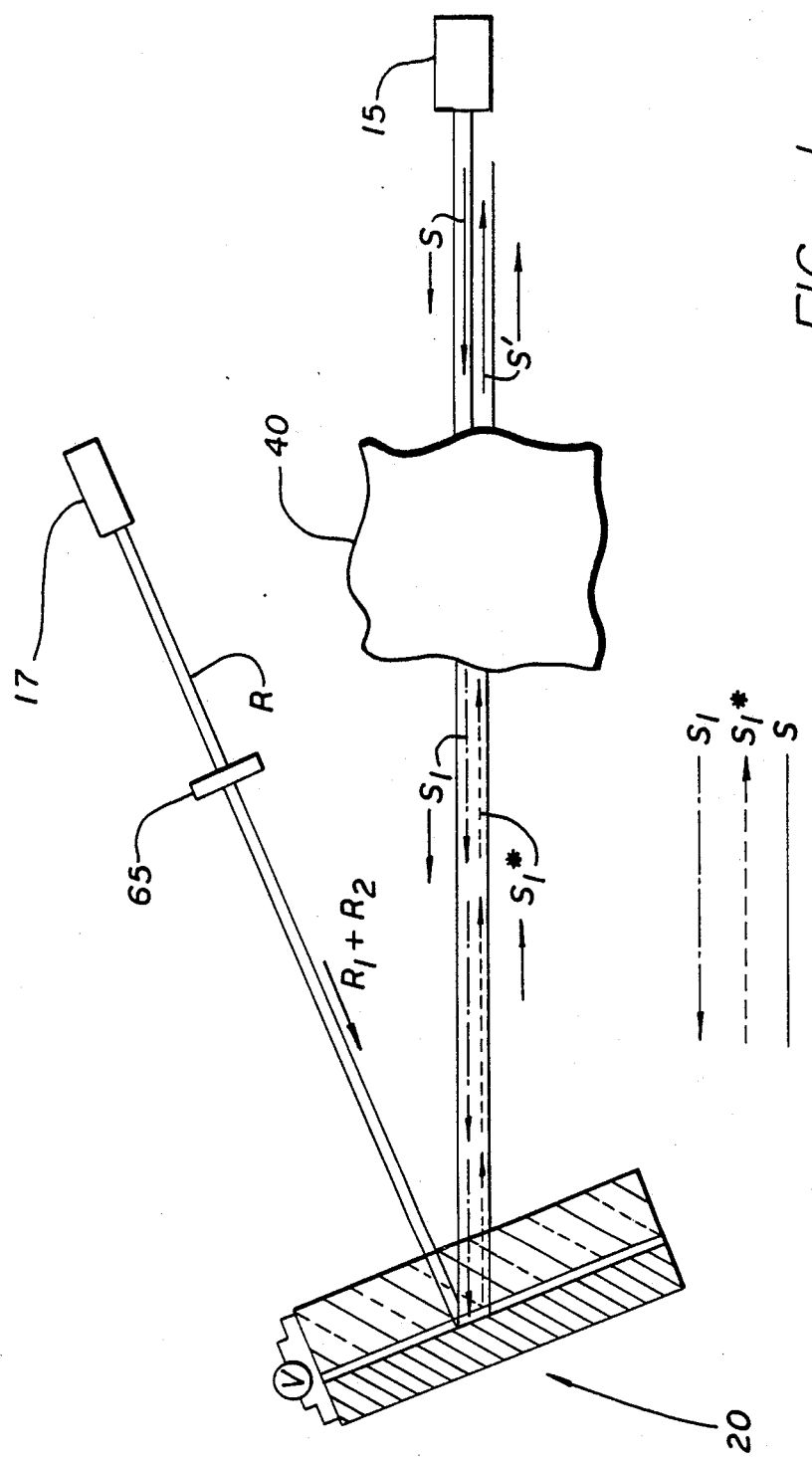
FIG. 1 includes an illustrative representation of the optical light valve system of the present invention.

FIG. 1 includes an illustrative representation of the optical light valve system 10 of the present invention. The system 10 of the present invention includes a signal beam source 15, a reference beam source 17, an improved optical light valve 20, and a liquid crystal phase retardation plate 65. The source 15 generates a signal beam S which is linearly polarized in a first direction and incident on a phase aberrating medium 40. Within the operational environment for the system 10 shown in FIG. 1, the phase aberrating medium 40 distorts the phase of optical beams passing therethrough. Accordingly, a phase aberrated version $S_1$ of the signal beam S emerges from the medium 40 and is incident on the light valve 20.

The reference beam source 17 provides a reference beam R coherent with and of the same wavelength as the signal beam S. The reference beam R includes strong $R_2$ and weak $R_1$ linearly polarized components and is also incident on the light valve 20. The weak component $R_1$ of the reference beam R is polarized in the first direction while the strong component $R_2$ is polarized in a second direction orthogonal to the first direction. The polarization direction of the beam $R_2$ is oriented so as to allow the light valve 20 to modulate the phase thereof. The relative magnitudes of the orthogonally polarized strong $R_2$ and weak $R_1$ components of the reference beam R may be controlled in a conventional manner by the liquid crystal phase retardation plate 65. Such control may be effected either through adjustment of the voltage applied to the plate 65 or through rotation of the phase retardation plate 65 relative to the beam 60.

As described more fully below, an interference pattern is formed within the light valve 20 by the weak component $R_1$ of the reference beam R in combination with the phase aberrated beam $S_1$. The strong component $R_2$ of the reference beam R is phase modulated by this interference pattern to provide a phase conjugated replica $S_1^*$ of the phase aberrated beam $S_1$. When the phase conjugated beam $S_1^*$ passes through the phase aberrating medium 40, it is transformed into a compensated beam $S$, having a phase equivalent to the phase conjugate of the signal beam S. In this manner the system 10 of the present invention has corrected for the phase distortion introduced into the signal beam S by the medium 40. As the magnitude of the beam $S_1^*$ may be increased by intensifying the strong component $R_2$ of the beam R via adjustment of the phase plate 65, the optical light valve system 10 of the present invention provides for phase conjugation with controllable optical gain.

Figure 2:
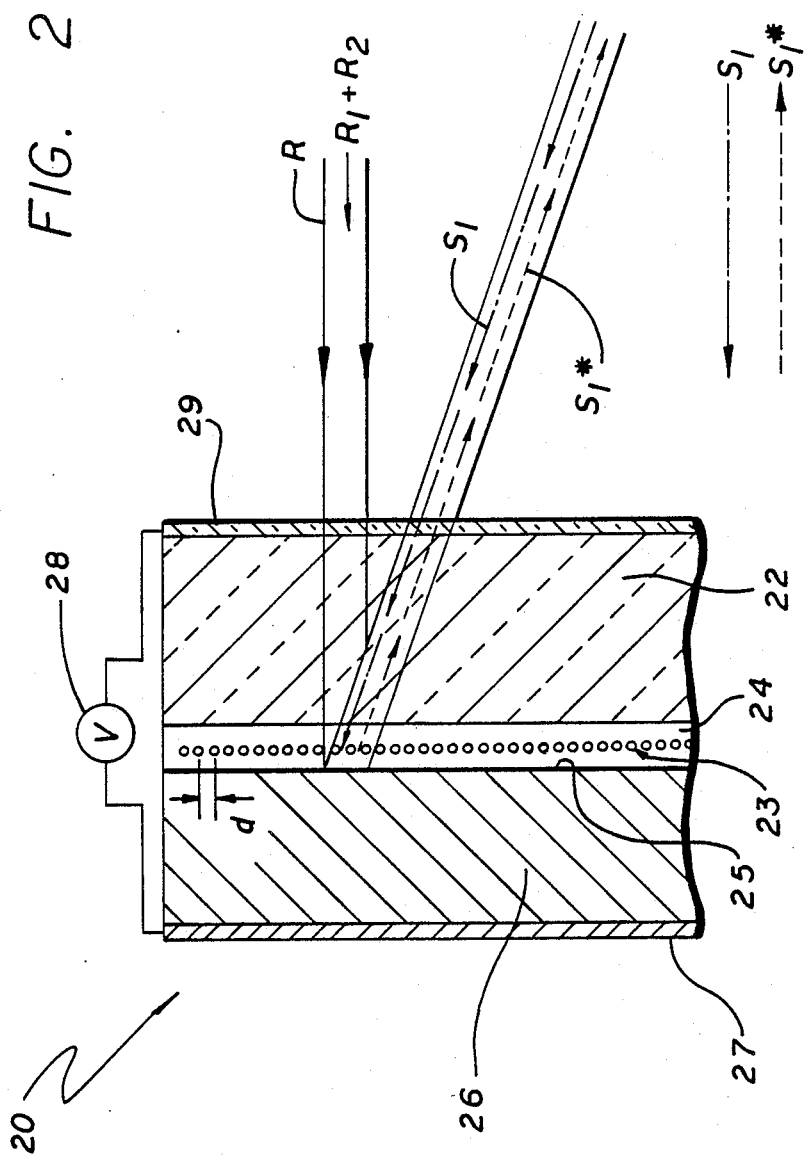
FIG. 2 is a side sectional view of a preferred embodiment of the improved optical light valve included within the system of the present invention.

FIG. 2 shows a more detailed cross sectional view of the improved optical light valve 20 included within the system 10 of the present invention. The coplanar, coparallel light valve 20 includes a liquid crystal layer 22, a photoconductive layer 26 and a wire grid mirror 24 sandwiched therebetween. The layers 22 and 26 are sandwiched between a first electrode 27 and a second electrode 29. The first electrode 27 is of standard design while the second electrode 29 is optically transparent. In addition, the electrodes 27 and 29 are connected to a voltage source 28. Further, the electrodes 27 and 29 are coupled to the photoconductive layer 26 and to the liquid crystal layer 22 by conventional means. The photoconductive layer 26 is typically made from a photosensitive (optically responsive) semiconductor such as silicon. The liquid crystal layer 22 may be fabricated from nematic liquid crystal.

Figure 3A:
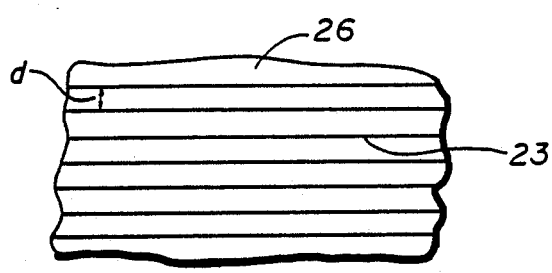
FIG. 3a is a front view of the wire grid mirror utilized in the improved optical light valve.
Figure 3B:
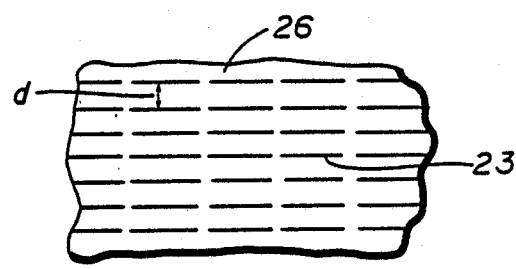
FIG. 3b is a front view of the wire grid mirror wherein the optically reflecting wires comprise evenly space line segments.

FIG. 2 also shows a cross sectional view of the wire grid mirror 24. The mirror 24 includes a planar array of evenly spaced wires 23 oriented parallel to a longitudinal axis. FIG. 3a shows a front view of the coplanar, parallel aligned wires 23 included within the mirror 24. The mirror 24 reflects substantially all optical energy polarized parallel to this longitudinal axis and passes optical energy polarized orthogonally to the axis. The spacing d of the wires 23 within the mirror 24 is chosen to be smaller than the wavelength of the optical energy to be passed/reflected. Additionally, to enhance resolution of an incident beam (image) it may be advantageous in some instances to include periodic spaces along the wires 23. FIG. 3b shows an alternative embodiment of the mirror 24 wherein the wires 23 comprise a plurality of uniformly spaced line segments. In the preferred embodiment the wires 23 comprise a submicron wire grid structure constructed from electrically conductive material such as aluminum, copper, gold or silver deposited on the photoconductive layer 26. This deposition may be patterned using holographic exposure techniques such as those disclosed by Garvin et al in U.S. Pat. No. 4,289,381.

As shown in FIG. 2, the reference beam R is typically chosen to be a uniform plane wave normally incident upon the liquid crystal layer 22. The reference beam component $R_2$ contributes neither to the spatially dependent magnitude nor to the phase of the interference pattern formed within the light valve 20. This results in an interference pattern having an intensity of the form given below (see again E. Marom and U. Efron, "Phase Conjugation of Low-Power Optical Beams Using Liquid-Crystal Light Valves", Optics Letters, Vol. 12, p. 504, July 1987):

$$I(X) = [E]^2 = E_r(x)^2 + E_s(x)^2 + 2E_r(x)E_s(x)\cos[\alpha X + g(X)] \quad [1]$$

where, $E_r(x) = E_r$ is the electric field of the weak component of the uniform reference beam 60 ($R_1$)

$E_s(x) = E_s\exp[i(\alpha X + g(X))]$ is the electric field of the beam 50 ($S_1$) with an angular field gradient of '$\alpha$'-radians/cm and a spatial phase variation g(X).

In the above expression [1] the plane of the interference pattern is taken as the z=0 plane and y-dependence is omitted. The third term in the the expression for I(X) above indicates that spatial variations in the intensity of the interference pattern are due solely to variations in the phase of the aberrated signal beam. As will be described below, this spatial variation in the intensity of the interference pattern induces a corresponding spatial dependence in the phase modulating properties of the liquid crystal layer 22.

As mentioned above, the weak component $R_1$ of the reference beam R and the phase aberrated beam $S_1$ are polarized in an identical (first) direction while the strong component $R_2$ of the reference beam R is polarized orthogonally relative to this first direction. In normal operation of the light valve 20, this first direction is perpendicular to the longitudinal (reflecting) axis of the mirror 24. Thus, after penetrating the optically transparent electrode 29 and the liquid crystal layer 22, the weak component $R_1$ of the reference beam R and the phase aberrated beam $S_1$ are passed by the mirror 24 to the photoconductive layer 26. In a similar manner, the strong component $R_2$ of the reference beam R is reflected by the mirror 24. The relative orientation of the beams $S_1$ and R is adjusted such that the weak component $R_1$ of the beam R and the beam $S_1$ pl intersect near the interface 25 of the mirror 24 and photoconductive layer 26. Upon intersection, the weak component $R_1$ of the reference beam R and the beam $S_1$ form an interference pattern which is sensed by the photoconductive layer 26.

As is known in the art, the photoconductive layer 26 responds to the interference pattern of the beams $S_1$ and $R_1$ through spatial variations in impedance. Specifically, variations in the optical intensity of this interference pattern induce corresponding variations in the impedance of the layer 26. As shown in FIG. 2, a voltage is applied by the source 28 which is partially dropped across the layer 26. Hence, the spatial variations in the impedance of the photoconductive layer 26 lead to corresponding spatial variations in the magnitude of the voltage dropped across the layer 26.

As shown in FIG. 2 the liquid crystal layer 22 is effectively electrically connected in series with the photoconductive layer 26 relative to the voltage source 28. Thus, spatial variations in the voltage drop across the photoconductive layer 26 induced by the interference pattern are mirrored as corresponding spatial variations in the voltage drop across the liquid crystal layer 22. For low activating voltages, the refractive index change of he liquid crystal is linearly proportional to the applied voltage (see e.g. U. Efron, et al.; *J. Opt. Soc. Am. B* 3, 247 (1986)). Additionally, it is known in the art that the refractive index of the liquid crystal 22 is proportional to the phase delay of optical energy traversing the liquid crystal layer 22. Hence the strong component $R_2$ of the reference beam R is phase modulated during propagation through the liquid crystal layer 22 in response to the interference pattern formed by the weak component $R_1$ of the reference beam R and the phase aberrated signal beam S. In this manner the strong component $R_2$ of the reference beam R reads out the interference pattern written on the liquid crystal layer in response to the beam $S_1$.

Figure 4:
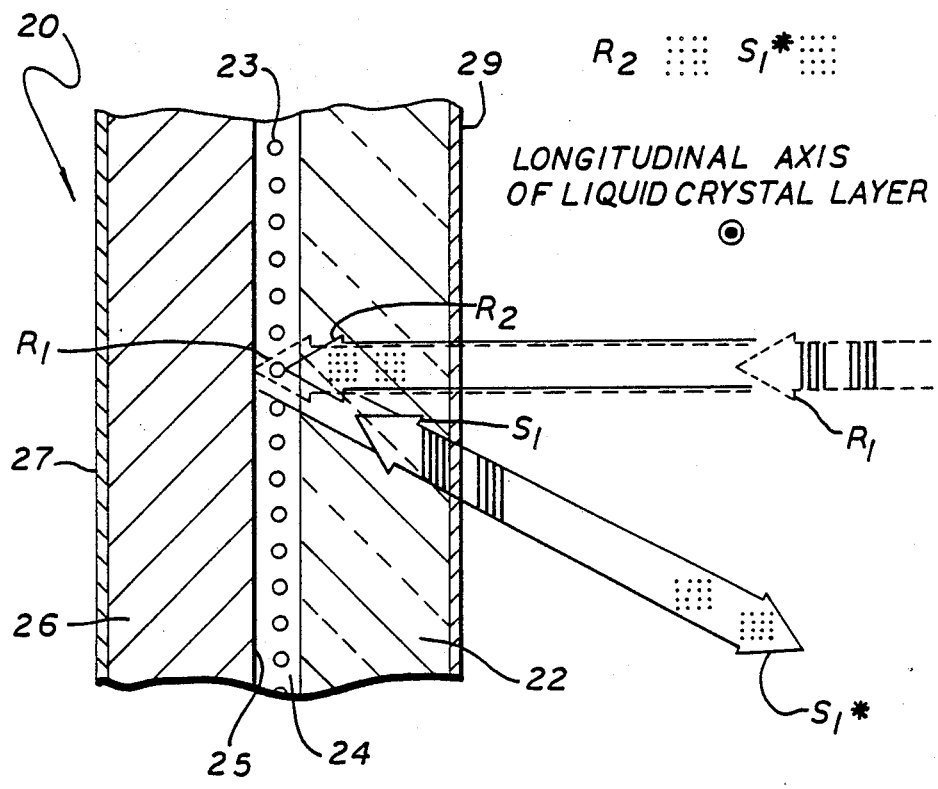
FIG. 4 shows a side sectional view of the improved optical light valve and also indicates the polarizations of the beams $S_1$, $S_1^*$, $R_1$, and $R_2$ relative to the longitudinal axes of the wire grid mirror and liquid crystal layer.

It is known in the art that the orientation of the longitudinal axis of the molecules included in the liquid crystal layer 22 relative to the polarization of incident optical energy affects the phase modulation thereof. Specifically, the light valve 20 generates the phase conjugated replica $S_1^*$ of the beam $S_1$ provided that the polarization direction of the strong component $R_2$ of the reference beam R is aligned with the longitudinal axis of the molecules within the liquid crystal layer 22. This alignment process may be achieved conventionally by using shallow and medium angle deposition of $SiO_2$. In addition, the particular composition of the liquid crystal layer 22 necessary to achieve optical phase conjugation is also known to those skilled in the art. For example Marom and Efron (*Optics Letters*, July 1987) disclose that a 4 $\mu$m thick nematic liquid crystal layer (E-7, BDH) was used in phase conjugation of optical energy having a wavelength of 632.8 nm. FIG. 4 shows an enlarged side sectional view of the light valve 20 which indicates the polarizations of the beams $R_1$, $R_2$, $S_1$ and $S_1^*$ relative to the mirror wires 23 and to the longitudinal axis of the liquid crystal layer 22.

As may be evident from the above, the polarization of the phase aberrated signal beam $S_1$ is not preserved upon phase conjugation. That is, with reference to FIG. 4 the polarization of the phase conjugated replica $S_1^*$ is rotated by 90 degrees from the polarization of the phase aberrated signal beam $S_1$. However, polarization preservation is unnecessary in many applications (e.g. associative memory or atmospheric compensation). Nonetheless, referring to FIG. 1 polarization preservation may be achieved through placement of a half-wave plate in the path of either the compensated beam S' or the phase conjugated replica beam $S_1^*$. Also, if the half-wave plate described above is to be implemented in the embodiment of FIG. 1, the optical path of the beams $S_1^*$ and S, must be altered by techniques known to those skilled in the art so that neither the beam S nor the beam $S_1$ also pass through the half-wave plate.

From the preceding discussion it should be apparent that one of the principal advantages of the optical light valve 20 included within the system 10 of the present invention is the ability to independently control the intensities of the interference pattern and the phase conjugated replica $S_1^*$ of the beam $S_1$. That is, the magnitudes of the first and second components of the reference beam $R_1$ and $R_2$ can be separately optimized using the phase plate 65 for writing and reading out the interference pattern impressed on the liquid crystal layer 22. This independent control allows phase conjugation with optical gain by separately optimizing the magnitude of the interference pattern and maximizing the amplitude of the phase conjugated replica $S_1^*$. For example if the beam $S_1$ is of relatively low intensity, the magnitude of the beam $R_1$ may be reduced so as not to mask the contribution of the beam $S_1$ to the interference pattern. Similarly, if a relatively large magnitude phase conjugated replica $S_1^*$ is desired, the reflective property of the mirror 24 allows the intensity of the strong component of the reference beam R used in generating the replica $S_1^*$ to be increased without saturating the photoconductive layer 26. Hence the present invention improves upon conventional optical phase conjugation systems (e.g. the system of Garibyan described above) by providing phase conjugation with controllable optical gain.

The phase retardation plate 65 may be utilized to make real-time adjustments in the magnitude of the weak component $R_1$ of the reference beam R by sampling the beam $S_1$. Specifically, the intensity of the beam $S_1$ is gauged by diverting a small portion of the beam $S_1$ to a photosensor (not shown). The signal generated by the photosensor is then used to control the phase retardation plate 65 and thereby adjust the magnitude of the beam $R_1$. In this way the intensity of the interference pattern may be maximized without masking the contribution of the beam $S_1$. This feature of the invention may be of considerable utility in optimizing the magnitude of the weak component $R_1$ of the reference beam R when the intensity of the beam $S_1$ varies widely as a function of time. In a presently preferred embodiment, the phase saturation plate 65 is a voltage-controlled liquid crystal phase plate such as a Babinet - Soleil compensator.

Thus the present invention has been described with reference to a particular embodiment in connection with a particular application. Those having ordinary skill in the art and access to the teachings of the present invention will recognize additional modifications and applications within the scope thereof. For example, the orientation of the liquid crystal layer 22 may be altered to effect modulation schemes other than phase conjugation. Similarly, the invention is not limited to the particular embodiments of the mirror 24 disclosed herein. Those skilled in the art may be aware of other devices for transmitting/reflecting optical energy of differing polarization states which may be suitable for inclusion in alternative embodiments of the present invention. Additionally, two individual coincident reference beams of differing polarization states may be substituted for the reference beam R without departing from the scope of the present invention. It is therefore contemplated by the appended claims to cover any and all such modifications.

Accordingly,
What is claimed is:

1. An optical light valve system comprising:
   means for providing a coherent signal beam of a first polarization state;
   means for providing a coherent reference beam having a first component of said first polarization state and a second component of a second polarization state; and
   light valve means for phase conjugating said second component of said reference beam in response to said signal beam.

2. The system of claim 1 wherein said light valve means includes mirror means for transmitting said signal beam of said first polarization state and said first reference beam component of said first polarization state and for reflecting said second reference beam component of said second polarization state.

3. The system of claim 2 wherein said mirror means includes a polarization sensitive mirror having an array of optically reflecting lines parallel to a longitudinal axis.

4. The system of claim 3 wherein each of said lines includes a plurality of spaced optically reflecting sections.

5. An optical light valve system comprising:
   means for providing a coherent signal beam of a first polarization state;
   means for providing a coherent reference beam having a first component of a first polarization state and a second component of a second polarization state;
   means for controlling the intensity of said first and second components of said reference beam;
   light valve means for phase conjugating said second component of said reference beam in response to said signal beam.

6. The system of claim 5 wherein said light valve means includes:
   a liquid crystal layer;
   a photoconductive layer;
   mirror means sandwiched between said liquid crystal and photoconductive layers for transmitting said signal beam of said first polarization state and said first reference beam component of said first polarization state and for reflecting said second reference beam component of said second polarization state.

7. The system of claim 6 wherein said intensity controlling means includes a liquid crystal phase plate.

8. An improved light valve comprising:
   a liquid crystal layer;
   a photoconductive layer;
   means for applying a voltage between said liquid crystal and photoconductive layers; and
   mirror means sandwiched between said liquid crystal and said photoconductive layers for transmitting radiant energy of a first polarization state and for reflecting radiant energy of a second polarization state.

9. The light valve of claim 8 wherein said mirror means includes a polarization sensitive mirror having an array of optically reflecting lines parallel to a longitudinal axis.

10. A method of generating a phase conjugated replica of an optical signal beam of a first polarization state comprising:
    (a) polarizing a first and a second component of a reference beam in said first and in a second polarization state, respectively;
    (b) transmitting said signal beam and said first component of said reference beam and reflecting said second component of said reference beam;
    (c) modulating the phase of said second component of said reference beam in response to the phase of said signal beam.

11. The method of claim 10 wherein said step of polarizing said first and second components of said reference beam includes the step of adjusting the intensities of said first and second components.

* * * * *